United States Patent
Gavling et al.

(10) Patent No.: US 9,637,022 B2
(45) Date of Patent: May 2, 2017

(54) ELECTRIC DRIVE MODULE AND METHOD FOR OPERATING AN ELECTRIC DRIVE MODULE

(71) Applicant: e-AAM Driveline Systems AB, Trollhättan (SE)

(72) Inventors: Emil K. Gavling, Trollhättan (SE); Phillip A. Gebel, Trollhättan (SE); Gabriel Trönnberg, Trollhättan (SE); Henric J. Gieryluk, Trollhättan (SE)

(73) Assignee: e-AAM Driveline Systems AB, Trollhättan (SE)

( * ) Notice: Subject to any disclaimer, the term of this patent is extended or adjusted under 35 U.S.C. 154(b) by 89 days.

(21) Appl. No.: 14/700,210

(22) Filed: Apr. 30, 2015

(65) Prior Publication Data
US 2016/0318419 A1 Nov. 3, 2016

(51) Int. Cl.
*F16H 48/36* (2012.01)
*B60L 15/02* (2006.01)
(Continued)

(52) U.S. Cl.
CPC ............ *B60L 15/025* (2013.01); *B60L 11/14* (2013.01); *B60L 15/2036* (2013.01);
(Continued)

(58) Field of Classification Search
CPC ............... F16H 48/36; F16H 2048/364; F16H 2048/368; B60L 15/025; B60L 15/2036
See application file for complete search history.

(56) References Cited

U.S. PATENT DOCUMENTS

| | | | | |
|---|---|---|---|---|
| 5,540,299 A | * | 7/1996 | Tohda | B60K 6/12 180/242 |
| 6,549,840 B1 | * | 4/2003 | Mikami | B60K 6/365 180/243 |

(Continued)

FOREIGN PATENT DOCUMENTS

| EP | 1985827 A1 | 10/2008 |
|---|---|---|
| WO | WO-2013191765 A1 | 12/2013 |

OTHER PUBLICATIONS

U.S. Appl. No. 14/661,348, Trönnberg et al.
(Continued)

*Primary Examiner* — Jacob S Scott
*Assistant Examiner* — Tinh Dang
(74) *Attorney, Agent, or Firm* — Harness, Dickey & Pierce, P.L.C.

(57) ABSTRACT

An electric drive module and a method for switching a drive module between a torque vectoring and at least one propulsion mode are provided. A controller can switch the drive module to the torque vectoring mode when a first set of conditions is met and can switch to one of the propulsion modes when either a second or a third set of conditions is met. The first set can include: torque requested by an operator is less than or equal to a first demand threshold; and a vehicle velocity is greater than or equal to a first velocity threshold. The second set can include: the vehicle velocity is less than a second velocity threshold; and a vehicle lateral instability is less than or equal to an instability threshold. The third set can include: the torque requested by the operator of the vehicle is greater than a second demand threshold.

20 Claims, 6 Drawing Sheets

(51) Int. Cl.
  *B60L 15/20*  (2006.01)
  *B60L 11/14*  (2006.01)

(52) U.S. Cl.
  CPC .......... *F16H 48/36* (2013.01); *B60L 2220/50* (2013.01); *B60L 2240/12* (2013.01); *B60L 2240/421* (2013.01); *B60L 2240/423* (2013.01); *B60L 2240/662* (2013.01); *B60L 2240/667* (2013.01)

(56) References Cited

U.S. PATENT DOCUMENTS

| | | |
|---|---|---|
| 6,549,842 B1 | 4/2003 | Hac et al. |
| 7,238,140 B2 | 7/2007 | Gradu |
| 7,491,147 B2 | 2/2009 | Ross |
| 7,854,279 B2 * | 12/2010 | Nakajima .......... B60L 15/2036 180/197 |
| 8,473,138 B2 | 6/2013 | Maki |
| 8,521,385 B2 | 8/2013 | Tronnberg et al. |
| 8,554,441 B1 | 10/2013 | Johansson et al. |
| 8,663,051 B2 | 3/2014 | Sten |
| 8,744,710 B2 | 6/2014 | Hiroya |
| 8,825,335 B2 | 9/2014 | Rylander |
| 2001/0042652 A1 | 11/2001 | Watson et al. |
| 2005/0278104 A1 | 12/2005 | Masuda et al. |
| 2007/0074565 A1 | 4/2007 | Jayakumar et al. |
| 2009/0272592 A1 | 11/2009 | Gaffney |
| 2010/0323837 A1 | 12/2010 | Rosemeier et al. |
| 2013/0144476 A1 | 6/2013 | Pinto et al. |
| 2013/0325323 A1 | 12/2013 | Breed |
| 2014/0364264 A1 | 12/2014 | Sten |

OTHER PUBLICATIONS von Vietinghoff, Anne: "Nichtlineare Regelung von Kraftfahrzeugen in querdynamisch kritischen Fahrsituationen".
Klomp Matthijs: "On Drive Force Distribution and Road Vehicle Handling—A Study of Understeer and Lateral Grip".
Klomp, Matthijs: "Longitudinal Force Distribution and Vehicle Handling".
"International Search Report" PCT/IB2011/001994.

* cited by examiner

ELECTRIC DRIVE MODULE AND METHOD FOR OPERATING AN ELECTRIC DRIVE MODULE

FIELD

The present disclosure relates to an electric drive module and a method for operating an electric drive module.

BACKGROUND OF THE DISCLOSURE

One means for correcting or reducing understeer or oversteer slide in a vehicle is a torque-vectoring differential (TVD). TVD's are typically electronically-controlled differentials that are capable of creating a moment about the center of gravity of a vehicle independent of the speed of the vehicle wheels that would be employed to correct or reduce the understeer or oversteer slide.

U.S. Pat. No. 7,491,147 discloses an engine-driven TVD that employs a pair of speed control mechanisms that are disposed on opposite sides of a differential mechanism. Each speed control mechanism comprises a (spur) gear reduction and a friction clutch. The gear reduction transmits rotary power from a differential case of the differential mechanism to the friction clutch, and from the friction clutch to an associated (axle) output shaft.

Similarly, U.S. Pat. No. 7,238,140 discloses an engine-driven TVD that employs a pair of torque diverters that are disposed on opposite sides of a differential mechanism. Each torque diverter comprises a gear reduction and a magnetic particle brake. The gear reduction transmits rotary power from a differential case of the differential mechanism to an output member that is coupled to an associated axle output shaft for rotation therewith. The magnetic particle brake is configured to selectively brake the output member of the gear reduction.

U.S. Patent Application Publication No. 2010/0323837 discloses an electrically-driven TVD having a pair of planetary transmissions, an electric motor, and a sleeve that controls the operation of the planetary transmissions. The TVD can be operated in a first mode in which the TVD is configured as an open differential that is driven by the electric motor, and a second mode in which the TVD produces a torque vectoring output.

Other TVDs utilize two electric motors, with one motor being dedicated to driving an open differential and a second motor dedicated to providing torque vectoring to an output member of the open differential. Such a configuration can be complex and costly.

While such configurations can be effective for performing a torque vectoring function in which rotary power can be re-allocated across the differential mechanism from one axle shaft to the other, TVD's are nonetheless susceptible to improvement.

SUMMARY OF THE DISCLOSURE

This section provides a general summary of the disclosure, and is not a comprehensive disclosure of its full scope or all of its features.

In one form, the present teachings provide for a method for controlling transmission of power to a set of vehicle wheels. The method can include providing a drive module for powering the set of vehicle wheels. The drive module can be operable in a torque vectoring mode and at least one propulsion mode. The method can include switching the drive module to the torque vectoring mode when a first set of conditions is met. The method can include switching the drive module to one of the propulsion modes when a second set of conditions is met. The method can include switching the drive module to one of the propulsion modes when a third set of conditions is met. The first set of conditions can include: a torque requested by an operator of the vehicle is less than or equal to a first predetermined demand threshold; and a velocity of the vehicle is greater than or equal to a first predetermined velocity threshold. The second set of conditions can include: the velocity of the vehicle is less than a second predetermined velocity threshold; and a lateral instability of the vehicle is less than or equal to a predetermined instability threshold. The third set of conditions can include: the torque requested by the operator of the vehicle is greater than a second predetermined demand threshold.

In another form, the present teachings further provide for a controller for a drive module that is operable in a plurality of modes to drive a pair of vehicle wheels. The controller can be configured to determine a torque that is requested by an operator of the vehicle, a velocity of the vehicle, and a level of instability of the vehicle. The controller can be configured to switch the drive module to a torque vectoring mode when a first set of conditions is met. The controller can be configured to switch the drive module to a propulsion mode when either a second set of conditions is met or a third set of conditions is met. The first set of conditions can include: a torque requested by an operator of the vehicle is less than or equal to a first predetermined demand threshold; and a velocity of the vehicle is greater than or equal to a first predetermined velocity threshold. The second set of conditions can include: the velocity of the vehicle is less than a second predetermined velocity threshold; and a lateral instability of the vehicle is less than or equal to a predetermined instability threshold. The third set of conditions can include: the torque requested by the operator of the vehicle is greater than a second predetermined demand threshold.

The present teachings further provide for a drive module including a motor, an input member, a differential assembly, a transmission, a shiftable element, an actuator, and a control module. The input member can be driven by the motor. The differential assembly can have a differential carrier and first and second differential outputs that can be received in the differential carrier. The transmission can receive rotary power from the input member. The shiftable element can be axially movable between a first position and a second position. The positioning of the shiftable element in the first position can couple the transmission to the differential assembly to establish a torque vectoring mode in which the transmission applies an equal but oppositely directed torque to the first and second differential outputs. The positioning of the shiftable element in the second position can couple the transmission to the differential assembly and can directly drive the differential carrier. The actuator can be coupled to the shiftable element and can be configured to axially move the shiftable element between the first and second positions. The control module can be configured to control the actuator to move the shiftable element to the first position when a first set of conditions is met. The control module can be configured to control the actuator to move the shiftable element to the second position when one of a second set of conditions or a third set of conditions is met. The first set of conditions can include: a torque requested by an operator of the vehicle is less than or equal to a first predetermined demand threshold; and a velocity of the vehicle is greater than or equal to a first predetermined velocity threshold. The second set of conditions can include: the velocity of the vehicle is less than a second predetermined velocity threshold; and a lateral instability of the vehicle is less than or equal to a predetermined instability threshold. The third set of conditions can include: the torque requested by the operator of the vehicle is greater than a second predetermined demand threshold.

Further areas of applicability will become apparent from the description provided herein. The description and specific examples in this summary are intended for purposes of illustration only and are not intended to limit the scope of the present disclosure.

BRIEF DESCRIPTION OF THE DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

DETAILED DESCRIPTION

Figure 1:
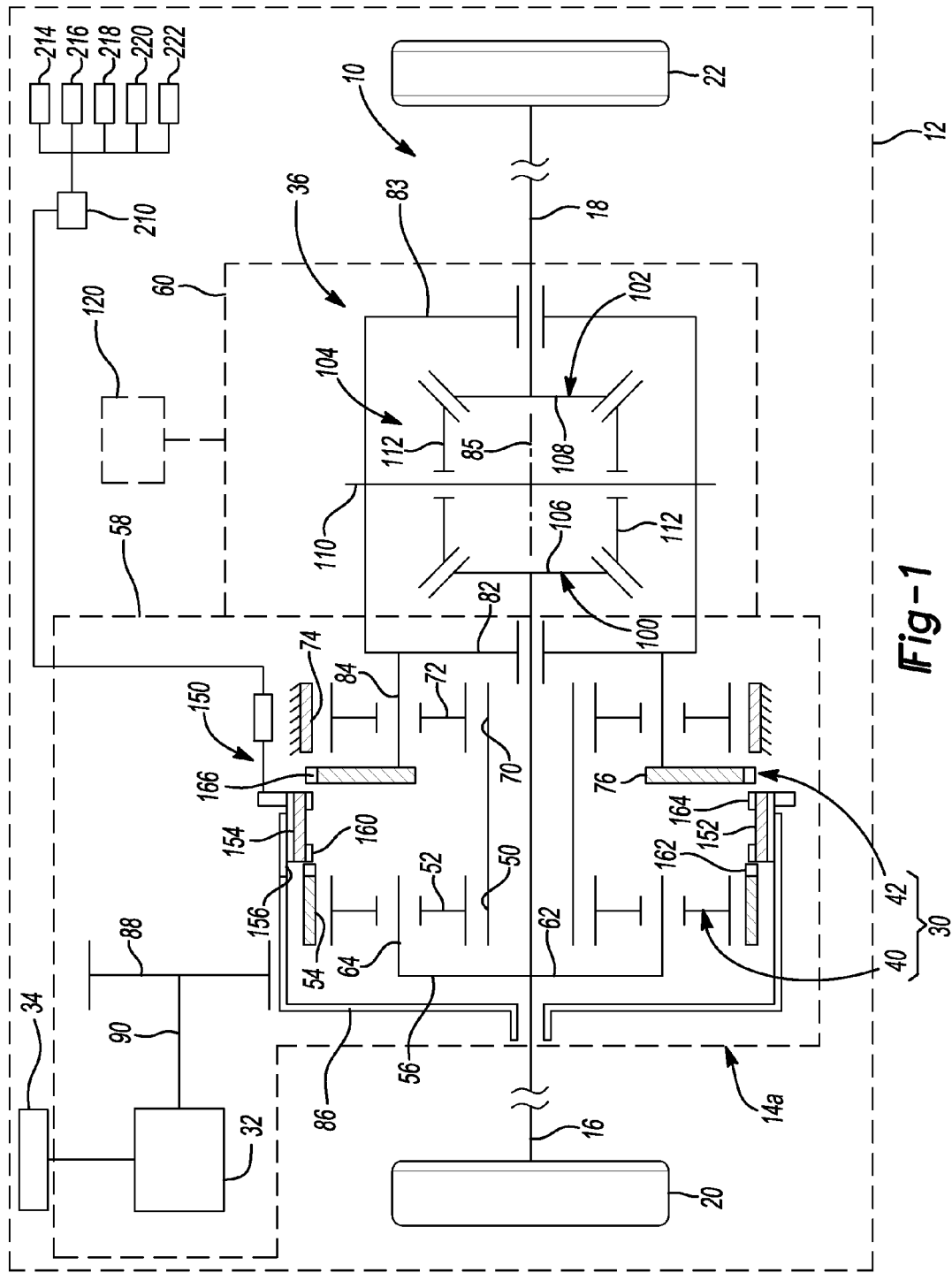
FIG. 1 diagrammatically illustrates a cross-sectional view of a drive module including a torque distribution drive mechanism operable in several modes according to a first embodiment.

With reference to FIG. 1, an axle assembly (e.g. drive module) constructed in accordance with the teachings of the present disclosure is generally indicated by reference numeral 10. By way of example, the axle assembly 10 can be constructed in accordance with U.S. Pat. No. 8,663,051, or in accordance with U.S. Patent Application Publication No. 2014/0364264, the disclosures of which are incorporated by reference herein. The axle assembly 10 could be a front axle assembly or a rear axle assembly of a vehicle 12 for example. The axle assembly 10 can include a torque distribution drive mechanism 14a, a first output member 16, a second output member 18, a left wheel 20, and a right wheel 22. The drive mechanism 14a may be used for transmitting torque to the first output member 16 and the second output member 18, which are illustrated as being first and second axle shafts, respectively, in the present example. For example, the first output member 16 may be coupled to the left wheel 20 and the second output member 18 may be coupled to the right wheel 22 of the axle assembly 10. In particular and as further explained below, the drive mechanism 14a may be selectively operable in a plurality of operational modes including a torque vectoring mode, a propulsion mode (i.e. drive or equal torque mode) and a neutral mode, where the torque vectoring mode can be used to generate a torque difference between the first and second output members 16 and 18.

The torque distribution drive mechanism 14a can comprise a dual planetary gear set 30, a drive member 32, a power storage device 34, and a differential assembly 36. The drive mechanism 14a can also include an actuator 150, a controller or control module 210, and a plurality of sensors 214, 216, 218, 220, 222.

The dual planetary gear set 30 can be co-axially mounted with respect to the first and second output members 16 and 18 and/or the differential assembly 36. The dual planetary gear set 30 can comprise a first planetary gear set 40 and a second planetary gear set 42. The first and second planetary gear sets 40 and 42 can have identical gear ratios and can be configured such that one or more of the components of the first planetary gear set 40 is/are interchangeable with associated component(s) of the second planetary gear set 42.

The first planetary gear set 40 can comprise a first sun gear 50, a plurality of first planet gears 52, a first ring gear 54, and a first planet carrier 56. The first sun gear 50 can be a generally hollow structure that can be mounted concentrically about the first output member 16. The first planet gears 52 can be spaced circumferentially about the first sun gear 50 such that teeth of the first planet gears 52 meshingly engage teeth of the first sun gear 50. Likewise, the first ring gear 54 can be disposed concentrically about the first planet gears 52 such that the teeth of the first planet gears 52 meshingly engage teeth on the first ring gear 54. The first ring gear 54 can be rotatably disposed in a transmission housing 58 that can be non-rotatably coupled to a differential housing 60 that houses the differential assembly 36. The first planet carrier 56 can include a first carrier body 62 and a plurality of first pins 64 that can be fixedly coupled to the first carrier body 62. The first carrier body 62 can be coupled to the first output member 16 such that the first carrier body 62 and the first output member 16 co-rotate. Any suitable means may be employed to couple the first carrier body 62 to the first output member 16, including welds and mating teeth or splines. Each of the first pins 64 can be received into an associated one of the first planet gears 52 and can support the associated one of the first planet gears 52 for rotation about a longitudinal axis of the first pin 64.

The second planetary gear set 42 can comprise a second sun gear 70, a plurality of second planet gears 72, a second ring gear 74, and a second planet carrier 76. The second sun gear 70 can be a generally hollow structure that can be mounted concentrically about the first output member 16. The second sun gear 70 can be non-rotatably coupled to the first sun gear 50 (e.g., the first and second sun gears 50 and 70 can be integrally and unitarily formed). The second planet gears 72 can be spaced circumferentially about the second sun gear 70 such that the teeth on the second planet gears meshingly engage teeth of the second sun gear 70. The second ring gear 74 can be disposed concentrically about the second planet gears 72 such that the teeth of the second planet gears 72 meshingly engage teeth on the second ring gear 74. The second ring gear 74 can be non-rotatably coupled to the transmission housing 58. The second planet carrier 76 can include a second carrier body 82 and a plurality of second pins 84 that can be fixedly coupled to the second carrier body 82. The second carrier body 82 can be coupled to a housing or differential carrier 83 of the differential assembly 36 such that the second carrier body 82 and the differential carrier 83 co-rotate. Each of the second pins 84 can be received into an associated one of the second planet gears 72 and can support the associated one of the second planet gears 72 for rotation about a longitudinal axis of the second pin 84.

The first and second planetary gear sets 40 and 42 can be co-aligned about a common longitudinal axis (i.e., an axis that can extend through the first and second sun gears 50 and 70) and can be offset from one another axially along the common longitudinal axis 85.

The drive member 32 can be any means for providing a rotary input to the dual planetary gear set 30, such as an electric or hydraulic motor, and can be employed to drive an input member 86 that transmits rotary power to a transmission input of the first planetary gear set 40. In the example provided, the drive member 32 is an electric motor electrically coupled to and configured to receive electrical power from the power storage device 34. The power storage device 34 can be any suitable type of electrical storage device, such as a battery, capacitor, super-capacitor, or a plurality or combination thereof. In the example provided, the input member 86 is rotatable relative to the first ring gear 54 and includes a plurality of teeth that meshingly engage teeth of a reduction gear 88 that is mounted on an output shaft 90 of the drive member 32. The input member 86 can comprise a crown gear that can be rotatably mounted about the first output member 16 and the first planetary gear set 40.

The actuator 150 can be employed to control the operational state of the drive mechanism 14a. The actuator 150 can include a shift sleeve 152 that can form the transmission input of the first planetary gear set 40. The shift sleeve 152 can have a toothed exterior surface 154, which can be non-rotatably but axially slidably engaged to a matingly toothed interior surface 156 of the input member 86, a set of first internal teeth 160, which can be matingly engaged to corresponding teeth 162 formed on the first ring gear 54, and a set of second internal teeth 164 that can be matingly engaged to corresponding teeth 166 formed on the second planet carrier 76.

The control module 210 can be configured to control the operation of the actuator 150, as will be described below. The control module 210 can be any suitable type of controller such as the vehicle's 12 ECU or a separate controller for example. The control module 210 can include or can be in communication with a computer-readable medium or memory circuit (not specifically shown) for storing programs and/or information for use by the control module 210. The control module 210 can be electrically coupled to the actuator 150 and the sensors 214, 216, 218, 220, 222. The control module 210 can be configured to receive signals from the sensors 214, 216, 218, 220, 222 and actuator 150 and to send controlling signals to cause the actuator 150 to the actuator 150 to adjust the position of the shift sleeve 152.

The sensors 214, 216, 218, 220, 222 can be any suitable type of sensors for detecting or measuring conditions or parameters of the vehicle 12 or of the environment in which the vehicle 12 operates, such as accelerometers, speed sensors, proximity sensors, GPS devices, rotation sensors, torque sensors, temperature sensors, or weather sensors for example. The sensor 214 can be coupled to the drive member 32 or to any suitable component to measure the actual torque output (T) by the drive mechanism 14a. The sensor 216 can be electrically coupled to the power storage device 34 and configured to measure the system energy available (E) in the power storage device 34. For example, the sensor 216 can be configured to measure the voltage of the power storage device 34.

The sensor 218 can be coupled to a throttle control (not shown, e.g. a gas pedal) or any other component suitable to measure the amount of torque demanded (т) by the driver. In the example provided, the sensor 218 can measure the position of the throttle control. The position of the throttle control can be physically measured, such as with position sensors for example, or can be determined from an electrical measurement such as the voltage output of a drive-by-wire throttle control for example. The sensor 220 can be configured to measure the longitudinal velocity (v) of the vehicle 12. The longitudinal velocity (v) can be measured using any conventional method, such as rotations of a calibrated part, GPS, radar, or laser measurements for example.

The sensor 222 can be configured to measure the lateral instability (s) of the vehicle. In the example provided, the lateral instability (s) can be a value ranging from positive one (+1) to negative one (−1), though other ranges or methods of determining instability can be used. When the lateral instability (s) is zero (0), the vehicle 12 can be fully stable (e.g. experiencing neither understeer, nor oversteer). When the vehicle 12 experiences understeer, the lateral instability (s) can be a positive number (e.g. between zero and positive one), with positive one indicating maximum understeer. When the vehicle 12 experiences oversteer, the lateral instability (s) can be a negative number (e.g. between zero and negative one), with negative one indicating maximum oversteer.

It is understood that additional sensors (not shown) can be used to measure other parameters. The control module 210 can also be configured to calculate additional values based on the measured parameters. The control module 210 can be configured to compare these measured or calculated values with reference or threshold values in a manner that will be discussed below.

The reference or threshold values can include a first or high velocity threshold ($v\_1$), a second or low velocity threshold ($v\_2$), a traction torque threshold ($T\_1$), a system energy threshold ($E\_1$), a first or low demand threshold ($т\_1$), a second or high demand threshold ($т\_2$), and a lateral instability threshold ($s\_1$).

The high velocity threshold ($v\_1$) can be a calibrated value depending on the vehicle 12. The high velocity threshold ($v\_1$) can be a value such that when the vehicle 12 is moving at speeds that are greater than or equal to the high velocity threshold ($v\_1$), the vehicle 12 is considered to be operated at high velocity. In the example provided, the high velocity threshold ($v\_1$) can be nine meters per second (9 m/s), though other values can be used. The value of the high velocity threshold ($v\_1$) can also be dependent on a condition external to the vehicle 12, such an ambient temperature or weather conditions. For example, if the ambient temperature is below a certain temperature, or if rain or snow is detected, then the high velocity threshold ($v\_1$) can be a different (e.g. lower) value.

The low velocity threshold ($v\_2$) can be a calibrated value depending on the vehicle 12. The low velocity threshold ($v\_2$) can be a value that is less than or equal to the high velocity threshold ($v\_1$). The low velocity threshold ($v\_2$) can be a value such that when the vehicle 12 is moving at speeds that are less than or equal to the low velocity threshold ($v\_2$), the vehicle 12 is considered to be operated at low velocity. In the example provided, the low velocity threshold ($v\_2$) can be seven meters per second (7 m/s), though other values can be used. The value of the low velocity threshold ($v\_2$) can also be dependent on a condition external to the vehicle 12, such as an ambient temperature or weather conditions. For example, if the ambient temperature is below a certain temperature, or if rain or snow is detected, then the low velocity threshold ($v\_2$) can be a different (e.g. higher) value.

The traction torque threshold ($T\_1$) can be a calibrated value depending on the vehicle 12. The traction torque threshold ($T\_1$) can be a value such that if the torque produced by the drive mechanism 14a (and/or the torque received by the drive mechanism 14a from the engine 120 or combination thereof) is greater than the traction torque threshold (T_1), then switching modes of the drive mechanism 14a would be undesirable. For example, the traction torque threshold (T_1) can be set to minimize discomfort to occupants of the vehicle 12 during shifting of modes, or to prevent damage to components of the drive mechanism 14a.

The system energy threshold (E_1) can be a calibrated value depending on the vehicle 12. Under some conditions, operating in the propulsion mode can draw more electrical power than when in the toque vectoring mode. Accordingly, the system energy threshold (E_1) can be a value such that if the electrical energy available to the drive mechanism 14a (such as from power storage device 34) is greater than or equal to the system energy threshold (E_1), then the amount of energy available can be considered adequate for operating in the propulsion mode. In the example provided, the system energy threshold (E_1) can be forty-five percent (45%) of the full charge of the power storage device 34, though other values can be used.

The low demand threshold (T_1) can be a calibrated value depending on the vehicle 12. The low demand threshold (T_1) can be a value such that if the driver demand for torque is less than or equal to the low demand threshold (T_1), then the amount of torque demanded is considered to be a low amount of torque. In the example provided, if the driver requests less than or equal to forty-five percent (45%) of the maximum throttle position (e.g. by depressing the gas pedal to a corresponding position), then the demanded torque (T) is considered low, though other values can be used. The value of the low demand threshold (T_1) can also be dependent on a condition external to the vehicle 12, such as an ambient temperature or weather conditions. For example, if the ambient temperature is below a certain temperature, or if rain or snow is detected, then the low demand threshold (T_1) can be a different (e.g. higher) value.

The high demand threshold (T_2) can be a calibrated value depending on the vehicle 12. The high demand threshold (T_2) can be a value that is greater than or equal to the low demand threshold (T_1). The high demand threshold (T_2) can be a value such that if the driver demand for torque is greater than or equal to the high demand threshold (T_2), then the amount of torque demanded is considered to be a high amount of torque. In the example provided, if the driver requests greater than or equal to sixty percent (60%) of the maximum throttle position (e.g. by depressing the gas pedal to a corresponding position), then the demanded torque (T) is considered high, though other values can be used. The value of the high demand threshold (T_2) can also be dependent on a condition external to the vehicle 12, such as an ambient temperature or weather conditions. For example, if the ambient temperature is below a certain temperature, or if rain or snow is detected, then the high demand threshold (T_2) can be a different (e.g. higher) value.

The lateral instability threshold (s_1) can be a calibrated value depending on the vehicle 12. The lateral instability threshold (s_1) can be a value such that if the vehicle 12 has a lateral instability (s) that has a magnitude that is less than or equal to the lateral instability threshold (s_1) (e.g. |s|≤s_1), then the vehicle 12 is considered adequately stable. For example, a positive (e.g. understeer) or negative (e.g. oversteer) instability value (s) of a magnitude less than or equal to the instability threshold (s_1) can be considered adequately stable. Alternatively, a range of values can be used. For example, if the lateral instability (s) is greater than or equal to an oversteer threshold (s_2) and less than or equal to an understeer threshold (s_3) (e.g. s_2≥s≤s_3), the vehicle 12 can be considered adequately stable. In such an example, the amount of oversteer and the amount of understeer indicative of instability can be different magnitudes.

In addition to the differential housing 60 and the differential carrier 83, the differential assembly 36 can include a means for transmitting rotary power from the differential carrier 83 to the first and second output members 16 and 18. The rotary power transmitting means can include a first differential output 100 and a second differential output 102. In the particular example provided, the rotary power transmitting means comprises a differential gear set 104 that is housed in the differential carrier 83 and which has a first side gear 106, a second side gear 108, a cross-pin 110 and a plurality of pinion gears 112. The first and second side gears 106 and 108 can be rotatably disposed about a rotational axis of the differential carrier 83 and can comprise the first and second differential outputs 100 and 102, respectively. The first output member 16 can be coupled to the first side gear 106 for common rotation, while the second output member 18 can be coupled to the second side gear 108 for common rotation. The cross-pin 110 can be mounted to the differential carrier 83 generally perpendicular to the rotational axis of the differential carrier 83. The pinion gears 112 can be rotatably mounted on the cross-pin 110 and meshingly engaged with the first and second side gears 106 and 108.

While the differential assembly 36 has been illustrated as employing bevel pinions and side gears, it will be appreciated that other types of differential mechanisms could be employed, including differential mechanisms that employ helical pinion and side gears or planetary gear sets.

Optionally, the differential assembly 36 may be coupled to a main or primary drive of the vehicle 12. In the particular example provided, the primary drive of the vehicle comprises an engine 120 that is employed to drive the differential assembly 36. In this regard, rotary power produced by the engine 120 can be transmitted in a conventional manner to the differential carrier 83 to drive the first and second output members 16 and 18 (i.e., via the differential carrier 83 and the differential gear set 104). In this way, the drive member 32 may serve as a complement to the primary drive of the vehicle 12 such that when an auxiliary torque is simultaneously generated by the drive member 32, the auxiliary torque will be superimposed to the first and second output torques induced by the primary drive as further explained in the following.

In the torque vectoring mode, the shift sleeve 152 can be positioned in a first position to couple the input member 86 to the first ring gear 54 (via engagement of the set of first internal teeth 160 to the teeth 162 on the first ring gear 54) such that the input member 86, the shift sleeve 152 and the first ring gear 54 co-rotate. It will be appreciated that the set of second internal teeth 164 are disengaged from the teeth 166 on the second planet carrier 76 when the shift sleeve 152 is in the first position.

In the first position, the drive member 32 may be selectively activated. When the drive member 32 is activated (i.e., when the output shaft 90 of the drive member 32 rotates in the example provided), the drive member 32, the reduction gear 88, the input member 86, and the shift sleeve 152 can cooperate to apply rotary power to the first ring gear 54 of the first planetary gear set 40. The rotary power received by the first ring gear 54 is transmitted via the first planet gears 52 and the first planet carrier 56 to the first output member 16, while an opposite reaction is applied to the first sun gear 50 such that the first sun gear 50 rotates in a direction that is opposite to the first planet carrier 56. Rotation of the first sun gear 50 causes corresponding rotation of the second sun gear 70 to thereby drive the second planet gears 72. Because the second ring gear 74 is rotationally fixed to the transmission housing 58, rotation of the second planet gears 72 causes rotation of the second planet carrier 76 in a direction that is opposite to the direction of rotation of the first planet carrier 56. Accordingly, the magnitude of the rotary power (i.e., torque) that is transmitted from the second planet carrier 76 to the differential carrier 83 (and through the differential assembly 36 to the second output member 18) is equal but opposite to the magnitude of the rotary power (i.e., torque) that is transmitted from the first planet carrier 56 to the first output member 16.

Thus, as a result, the torque induced by the drive member 32 to the first and second output members 16 and 18, respectively, is counter-directed. Moreover, since the first and second planetary gear sets 40 and 42 are operably coupled via the differential assembly 36, the magnitude of the induced torque at the first and second output members 16 and 18 is substantially equal. For example, if a positively directed torque is transmitted to the first output member 16 (via rotation of the output shaft 90 of the drive member 32 in a first rotational direction), an equal negative torque is transmitted to the second output member 18. Similarly, if a negatively directed torque is transmitted to the first output member 16 (via rotation of the output shaft 90 of the drive member 32 in a second rotational direction opposite the first rotational direction), an equal positive torque is transmitted to the second output member 18. In other words, the drive mechanism 14a may be employed to generate a torque difference between the first and second differential outputs 100 and 102, which is communicated to the left and the right wheels 20 and 22, respectively, through the first and second output members 16 and 18, respectively.

In configurations where the optional primary drive (i.e., engine 120 in the example illustrated) is included, and the drive member 32 is activated when rotary power is transmitted from the primary drive to the differential assembly 36, the torque transmitted by the drive mechanism 14a will act as an offset torque which is superposed to the input torque transmitted to the axle assembly 10 from the primary drive. Stated another way, the input torque from the primary drive is distributed via the differential assembly 36 such that a first drive torque is applied via the first differential output 100 to the first output member 16 and a second drive torque is applied via the second differential output 102 to the second output member 18, while a supplemental torque induced by the drive member 32 is distributed via the dual planetary gear set 30 such that a first vectoring torque is applied to the first output member 16 and a second vectoring torque (which is equal and opposite to the first vectoring torque in the example provided) is applied to the second output member 18 (via the differential assembly 36). The net torque acting on the first output member 16 is the sum of the first drive torque and the first vectoring torque, while the net torque acting on the second output member 18 is the sum of the second drive torque and the second vectoring torque.

As an example, the drive mechanism 14a may subtract a torque from the left wheel 20 and add a corresponding torque to the right wheel 22 when the motorized vehicle 12 turns left, and may subtract a torque from the right wheel 22 and add a corresponding torque to the left wheel 20 when the motorized vehicle 12 turns right to improve the turning behavior of the vehicle 12 and decrease its turning radius.

Those of skill in the art will appreciate that the configuration of the dual planetary gear set 30 causes the first and second sun gears 50 and 70 to experience the highest rotational velocity, while the first ring gear 54 rotates at a somewhat slower rotational velocity, and the first and second planet carriers 56 and 76 rotate at a rotational velocity that is slower than that of the first ring gear 54. In this way a favorable gear ratio, such as a gear ratio of about 1:1.5 to about 1:2.0, can be achieved between the first ring gear 54 and the first output member 16. As a result, the size of the gears of the dual planetary gear set 30 may be made small. For example, the diameter of the first and second planet gears 52 and 72 may be as small as about 30 mm. In this way, the size of the dual planetary gear set 30 may be small, and thereby the drive mechanism 14a may be made compact and lightweight.

The drive member 32 can be activated (e.g., automatically or on an as-needed basis) when the vehicle 12 turns. During straight forward driving, the drive member 32 can be non-activated to permit the wheels 20, 22 to rotate freely, or in the configuration were the optional primary drive (i.e., engine 120) transmits rotary power to the differential assembly 36, the vehicle 12 can be propelled in a forward direction by the engine 120. In such a situation, the differential assembly 36, which receives the input torque from the engine 120, transmits a substantially equal torque to the first output member 16 and the second output member 18. In turn, a substantially equal torque is transmitted to the first and second planetary carriers 56 and 76 which rotate with a substantially equal speed. As an effect, and due to the identical planetary gear sets 40 and 42, there will be no relative motion between the first and second ring gears 54 and 74, meaning that almost no effect or torque is transferred to the first and second ring gears 54 and 74. In other words, neither the first ring gear 54 nor the second ring gear 74 will rotate. In this way, the output shaft 90 of the drive member 32 will not move and losses during straight forward driving are in this way minimized.

While the input member 86 has been illustrated and described as directly engaging the reduction gear 88, it will be appreciated that one or more reduction stages could be disposed between the input member 86 and the reduction gear 88 or that the input member 86 could be directly driven by the drive member 32.

In the propulsion mode, the shift sleeve 152 can be positioned in a second position to couple the input member 86 to the second planet carrier 76 (via engagement of the set of second internal teeth 164 with the teeth 166 on the second planet carrier 76) such that rotary power provided by the drive member 32 is input to differential carrier 83 and applied to the first and second output members 16 and 18 via the differential assembly 36. It will be appreciated that the set of first internal teeth 160 on the shift sleeve 152 can be disengaged from the teeth 162 on the first ring gear 54 when the shift sleeve 152 is in the second position. It will also be appreciated that rotary power provided by the drive member 32 when the drive mechanism 14a is operated in the propulsion mode is employed for propulsive power to propel (or aid in propelling) the vehicle 12. It will also be appreciated that where the optional primary drive (i.e., engine 120) is included and the drive mechanism 14a is operated in the propulsion mode, rotary power provided by the drive member 32 adds to the torque provided by the engine 120 to the differential carrier 83 to aid in propelling the vehicle 12.

In the neutral mode, the shift sleeve 152 can uncouple the input member 86 from the first ring gear 54 and the second planet carrier 76 such that the input member 86 is decoupled from the first planetary gear set 40, the second planetary gear set 42, and the differential carrier 83. In the example provided, the shift sleeve 152 can be positioned in a third position between the first and second positions such that the sets of first and second internal teeth 160 and 164 are disposed axially between and disengaged from the teeth 162 on the first ring gear 54 and the teeth 166 on the second planet carrier 76. Accordingly, placement of the shift sleeve 152 in the third position decouples the drive member 32 from the first planetary gear set 40, the second planetary gear set 42 and the differential carrier 83.

Figure 2:
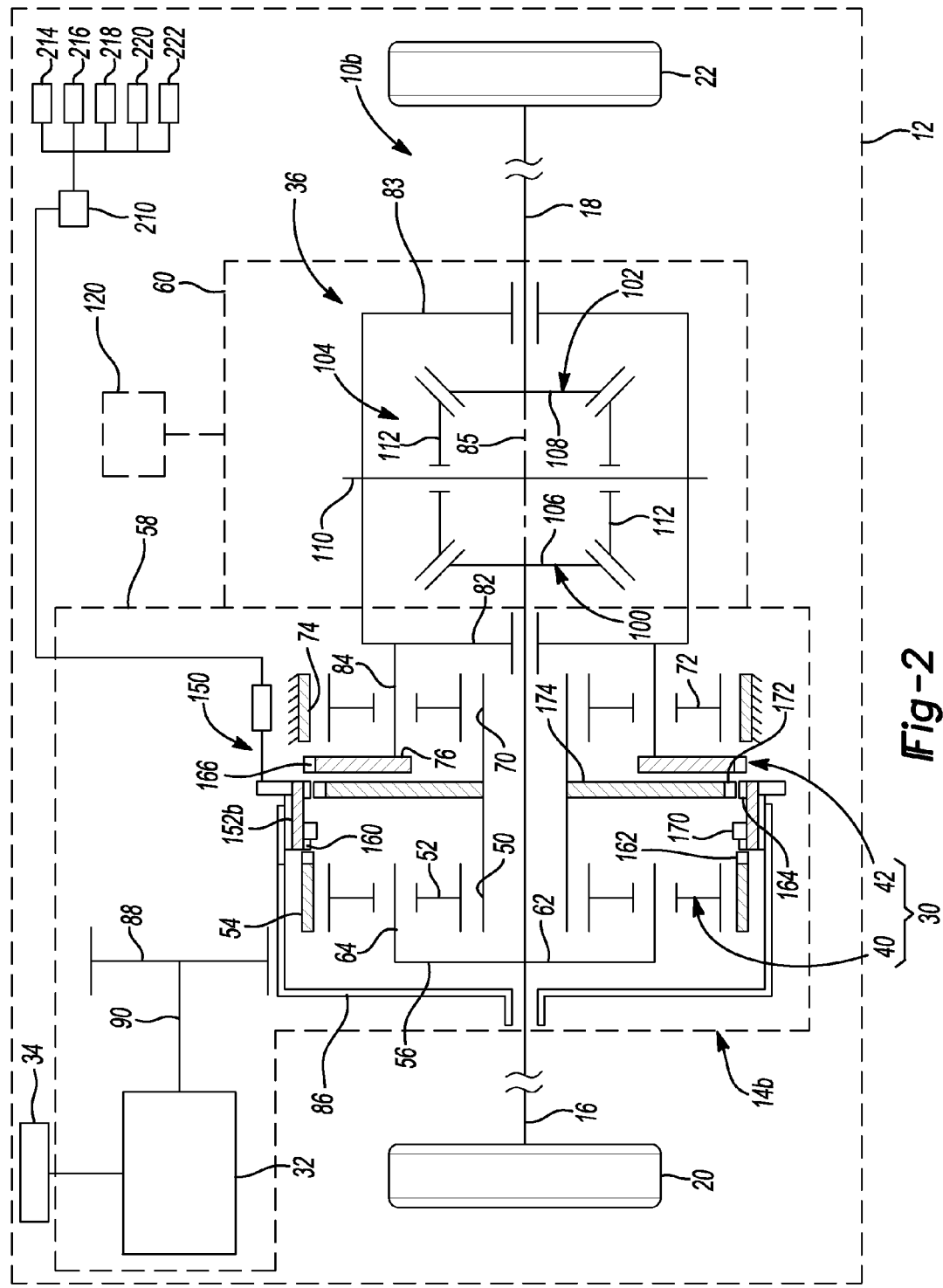
FIG. 2 diagrammatically illustrates a cross-sectional view of a drive module including a torque distribution drive mechanism operable in several modes according to a second embodiment.

With reference to FIG. 2, yet another axle assembly (e.g. drive module) constructed in accordance with the teachings of the present disclosure is generally indicated by reference numeral 10b. The axle assembly 10b can be generally similar to the axle assembly 10 of FIG. 1 except as noted herein. In this example, the axle assembly 10b comprises a drive mechanism 14b that is selectively operable in a plurality of operational modes including a torque vectoring mode, a propulsion mode (i.e. high speed propulsion, drive or equal torque mode), a neutral mode and a low speed propulsion mode. The torque distribution drive mechanism 14b can be structurally similar to the torque distribution drive mechanism 14a of FIG. 1, except that the shift sleeve 152b can have a third set of internal teeth 170 that can be selectively engaged to teeth 172 of a toothed element 174 that is coupled to the first and second sun gears 50 and 70 for rotation therewith. The set of third internal teeth 170 are not engaged to any other structure when the drive mechanism 14b is operated in the torque vectoring, propulsion, and neutral modes and as such, the operation of the drive mechanism 14b is substantially similar to the operation of drive mechanism 14a of FIG. 1 in these modes.

In the low speed propulsion mode, however, the shift sleeve 152b can be positioned in a fourth position to couple the input member 86 to the first and second sun gears 50 and 70 (via the engagement of the set of third internal teeth 170 to the teeth 172 on the element 174) such that the input member 86, the shift sleeve 152b, the element 174, and the first and second sun gears 50 and 70 co-rotate. In this mode, the second planetary gear set 42 is employed as a gear reduction which causes the second planet carrier 76 to rotate at a rotational speed that is lower than the rotational speed of the second sun gear 70. It will be appreciated that the sets of first and second internal teeth 160 and 164 are disengaged from the teeth 162 on the first ring gear 54 and the teeth 166 on the second planet carrier 76 when the shift sleeve 152b is in the fourth position.

Those of skill in the art will appreciate that rotary power is input to the dual planetary gear set 30 at different locations when drive mechanism 14b is operated in the propulsion mode and in the low speed propulsion mode. In this regard, rotary power is input to the second planet carrier 76 in the high speed propulsion mode, and input to the first and second sun gears 50 and 70 in the low speed propulsion mode. Accordingly, it will be appreciated that the differential carrier 83 will rotate at a slower rotational velocity (for a given rotational speed of the output shaft 90 of the drive member 32) in the low speed propulsion mode as compared to the high speed propulsion mode. In this regard, rotation of the first and second sun gears 50 and 70 when the drive mechanism 14b is operated in the low speed propulsion mode, will cause corresponding rotation of the second planet gears 72, which in turn drives the rotation of the second planet carrier 76 and the differential carrier 83. Stated another way, a gear reduction is disposed between the rotary input (i.e., the element 174) and the differential carrier 83 when the drive mechanism 14b is operated in the low speed propulsion mode, and no gear reduction is disposed between the rotary input (i.e., the second planet carrier 76) and the differential carrier 83 when the drive mechanism 14b is operated in the high speed propulsion mode.

The dimension of the shift sleeve 152 in the axial direction and the width and spacing of the several sets of teeth can be selected such that at most one of the sets of internal teeth 160, 164 and 170 is permitted to engage the corresponding teeth 162, 166 and 172, respectively, at the same time. Additionally or alternatively, the pitch diameters of the mating sets of teeth can be sized differentially to permit certain teeth to slide over other teeth where engagement of those teeth are not desired. For example, the pitch diameter of the set of second internal teeth 164 is larger than the pitch diameter of the set of third internal teeth 170 so that the set of second internal teeth 164 may pass axially across the teeth 172 on the element 174 that is rotatably coupled to the first and second sun gears 50 and 70.

Similar to the construction of FIG. 1, described above, the switching element (e.g. actuator 150) may comprise the shift sleeve 152b that is rotationally coupled to the crown gear (input member 86b). Further, the switching element may comprise the radially extending teeth structure (second internal teeth 164) which is arranged on the shift sleeve 152b in an inwards radial direction and which is arranged to engage with the mating teeth structure (teeth 166) on the outer surface of the differential carrier 83. The shift sleeve 152b may slide along the crown gear 86b in an axial direction. By sliding the shift sleeve 152b towards the differential assembly 36, the second internal teeth 164 of the shift sleeve 152b may engage with the mating teeth structure 166 on the differential carrier 83. In this way, the torque distribution drive mechanism 14b is operable in the high speed propulsion mode. When sliding the shift sleeve 152b away from the differential assembly 36, the second internal teeth 164 of the shift sleeve 152b disengages from the teeth 166 on the outer surface of the differential carrier 83. In this way, the drive mechanism 14b will be in a neutral mode since it does not induce any torque to the differential assembly 36.

One advantage with this construction is that it may be formed in a modular way. That is, the construction may be formed as a module which easily may be added to a differential in an existing transmission.

Figure 4:
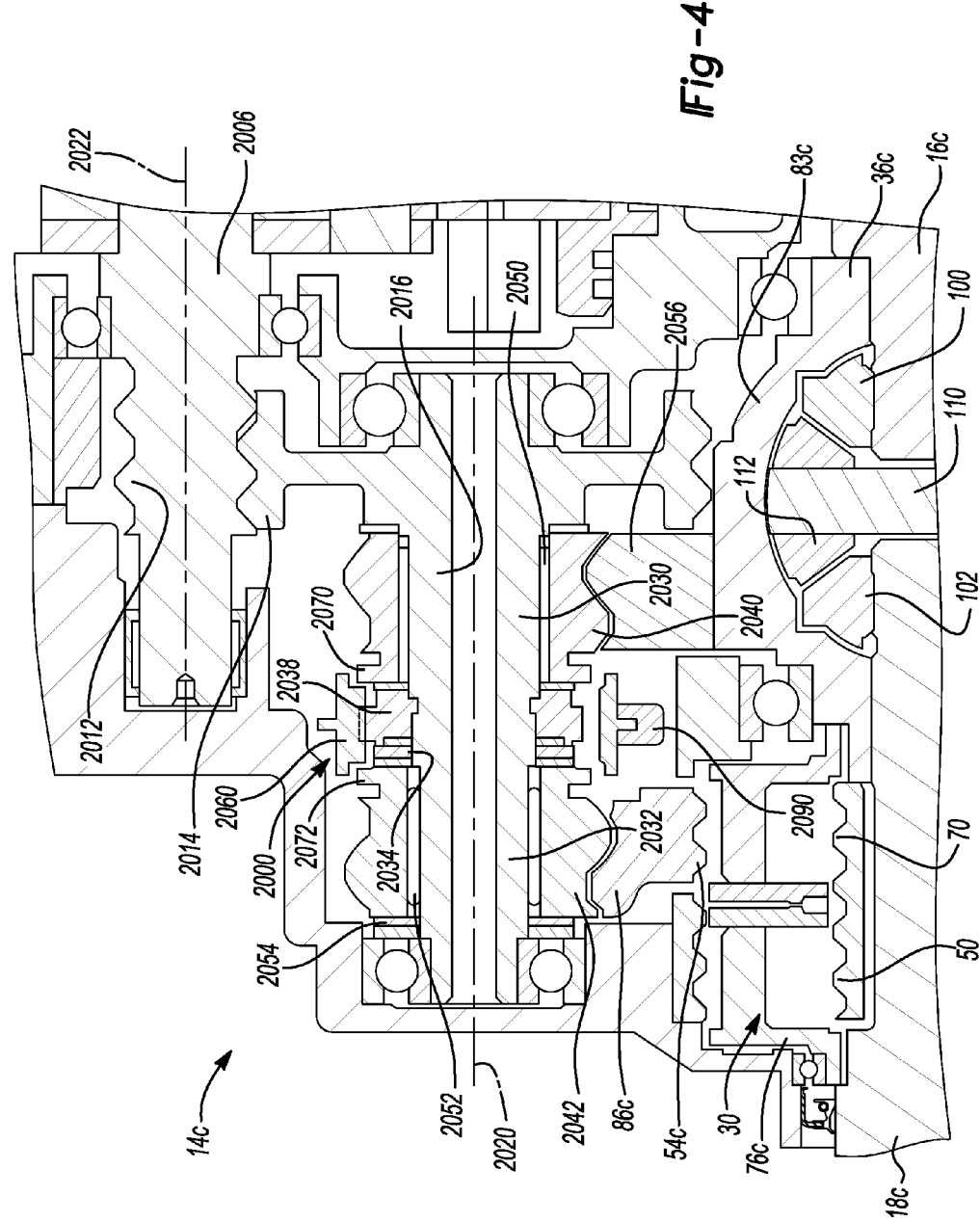
FIG. 4 is an enlarged portion of FIG. 3.
Figure 5:
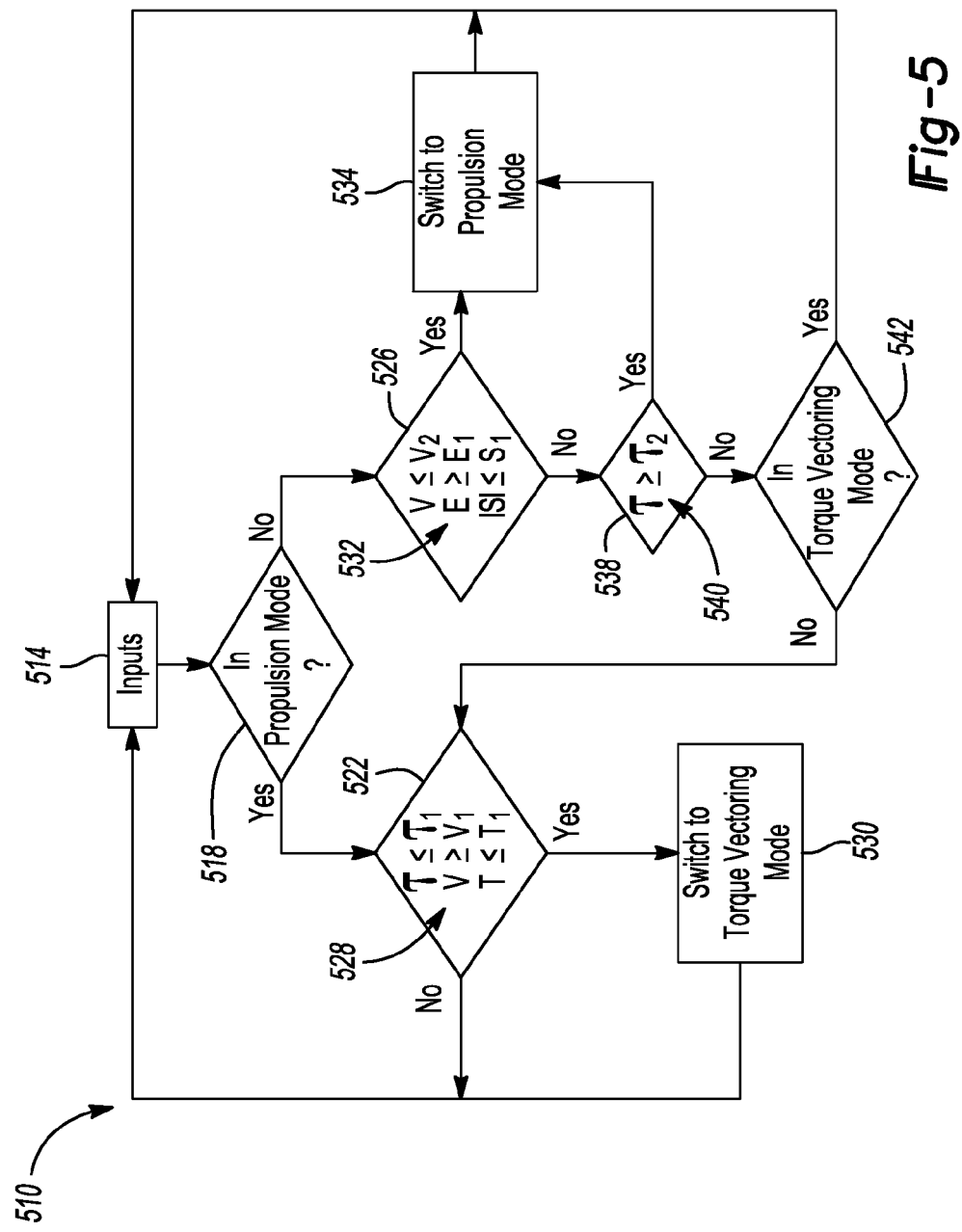
FIG. 5 is a diagram of a first logic routine for switching between modes of a torque distribution drive mechanism such as those shown in FIGS. 1-4.
Figure 6:
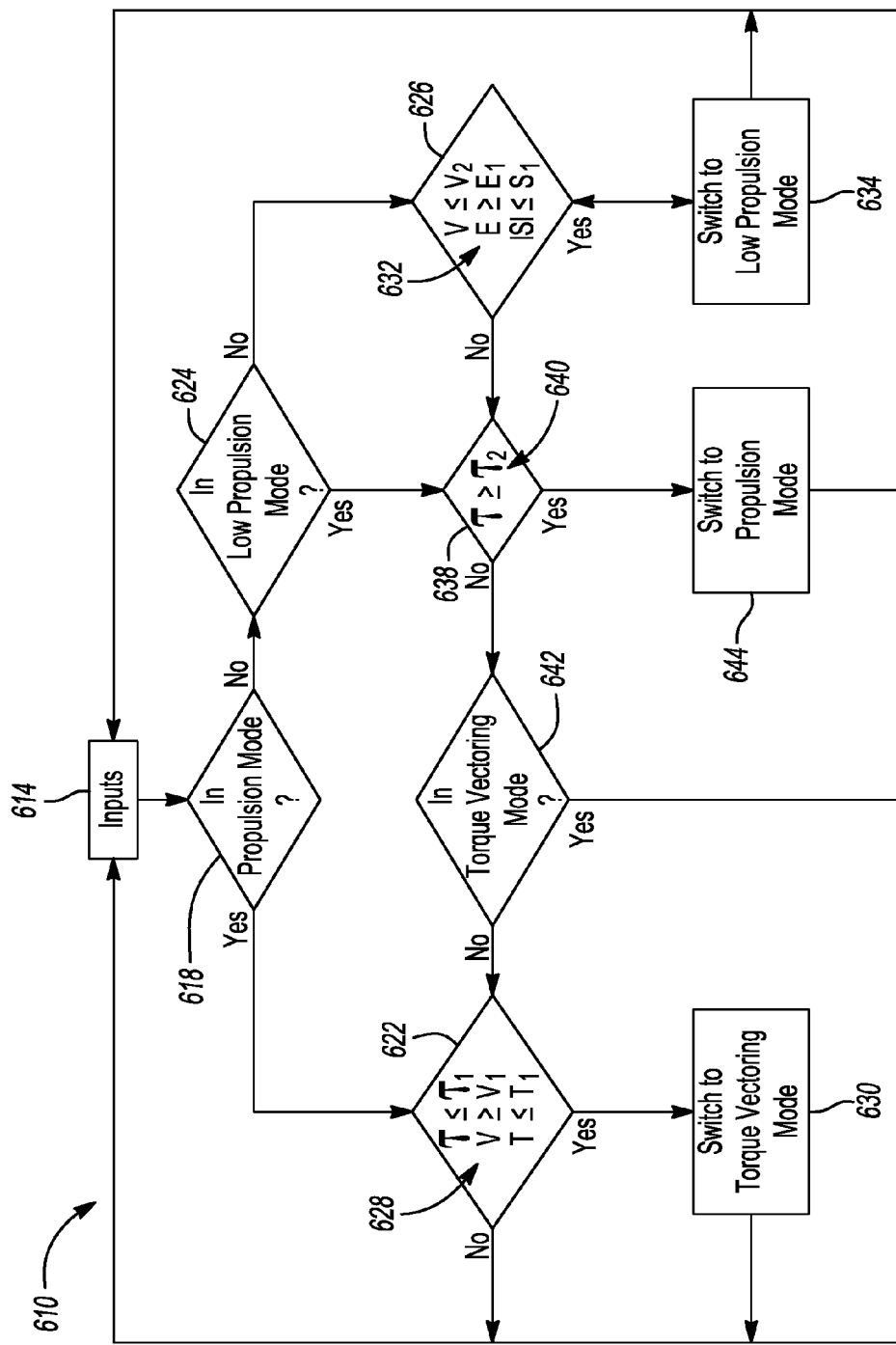
FIG. 6 is a diagram of a second logic routine for switching between modes of a torque distribution drive mechanism such as that shown in FIG. 2.

The switching element or shift sleeve 152, 152b in each of the drive mechanisms 14a, 14b can be moved axially by any desired actuator 150, including conventional shift fork actuators of the type that are commonly used in transfer cases or the actuator described in U.S. Patent Application Publication No. 2014/0364264 with reference to FIGS. 4-6 of U.S. Patent Application Publication No. 2014/0364264. It will be appreciated, too, that one or more synchronizers can be incorporated with the shift sleeve 152, 152b to permit the shift sleeve 152, 152b to be driven (e.g., via the first ring gear 54 or the second planetary carrier 76) prior to activation of the drive member 32 such that the rotational speed of the shift sleeve 152, 152b matches the rotational speed of the component to which the shift sleeve 152, 152b is to be rotationally coupled.

Figure 3:
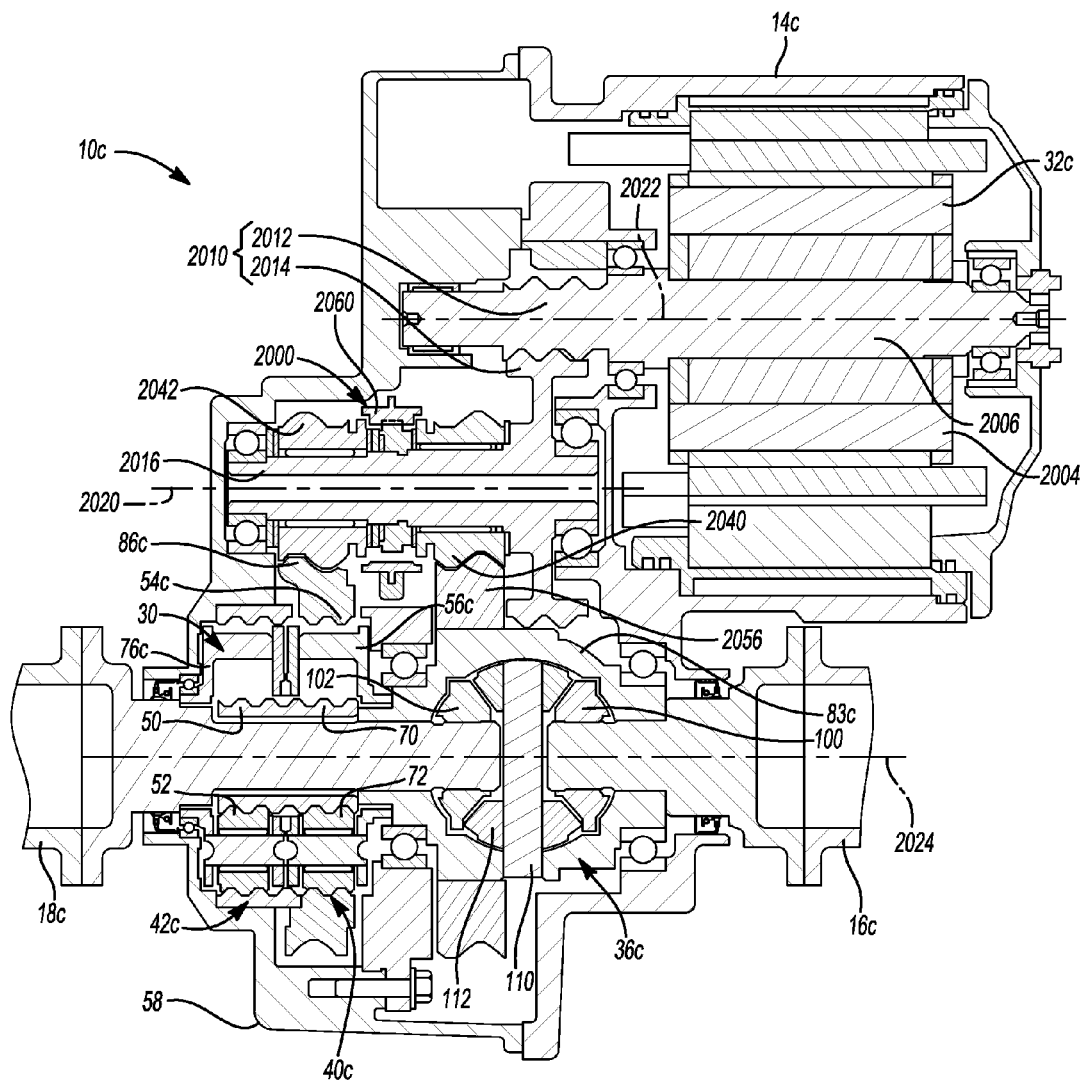
FIG. 3 is a longitudinal section view of a portion of a drive module including a torque distribution drive mechanism operable in several modes according to a third embodiment.

In FIGS. 3 and 4 of the drawings, a portion of another axle assembly 10c (e.g. drive module) constructed in accordance with the teachings of the present disclosure is illustrated. The axle assembly 10c can include a torque distribution drive mechanism 14c that can be somewhat similar to the torque distribution drive mechanism 14a of FIG. 1, except as shown and described below. In one aspect, the drive member 32c and a clutch mechanism 2000 can cooperate to alternately provide rotary power that is employed by the differential assembly 36c for propulsive power or for the dual planetary gear set 30 for torque vectoring control of the first and second output members 16c and 18c.

The drive member 32c can comprise any type of motor, such as a DC electric motor 2004, and can have an output shaft 2006 that can be selectively operated to provide rotary power to a reduction drive 2010. The reduction drive 2010 can include a first pinion gear 2012, which can be mounted to the output shaft 2006 for rotation therewith, and a second pinion gear 2014 that can be mounted to an intermediate shaft 2016 for rotation therewith. The intermediate shaft 2016 can be disposed along an intermediate axis 2020 that is generally parallel to an output shaft axis 2022 about which the output shaft 2006 of the motor 2004 rotates. The intermediate axis 2020 and the output shaft axis 2022 can be parallel to an axis 2024 about which the differential assembly 36c and the first and second output members 16c and 18c rotate. In the particular example provided, the intermediate axis 2020, the output shaft axis 2022 and the axis 2024 are disposed in a common plane, but it will be appreciated that one or both of the intermediate axis 2024 and the output shaft axis 2022 can be positioned differently. Moreover, it will be appreciated that one or more of the axes 2020 and 2022 may be spaced apart from the axis 2024 so that one of the axes 2020, 2022 and 2024 will not lie in a common plane. While the reduction drive 2010 has been described and illustrated as having but a single pair of gears, it will be appreciated that the reduction drive could alternatively comprise additional gears disposed in a gear train between the first pinion gear 2012 and the second pinion gear 2014.

With specific reference to FIG. 4, the intermediate shaft 2016 can have a first journal portion 2030, a second journal portion 2032 and a drive portion 2034 that can be disposed between the first and second journal portions 2030 and 2032. The drive portion 2034 can have a plurality of external splines or teeth that can be meshingly engaged to a plurality of internal splines or teeth that can be formed on a drive member 2038. A first intermediate output gear 2040 can be rotatably received on the first journal portion 2030 and a second intermediate output gear 2042 can be rotatably received on the second journal portion 2032. Bearings 2050 and 2052 can be received between the first and second journal portions 2030 and 2032 and the first and second intermediate output gears 2040 and 2042, respectively. Thrust bearings 2054 can be disposed along the length of the intermediate shaft 2016 at various locations to help promote relative rotation between the drive member 2038 and the first and second intermediate output gears 2040 and 2042.

The first intermediate output gear 2040 can be meshingly engaged to a ring gear 2056 of the differential assembly 36c. The ring gear 2056 can be fixedly coupled to the differential carrier 83c for common rotation. It will be appreciated that rotation of the first intermediate output gear 2040 can cause corresponding rotation of the ring gear 2056 and the differential carrier 83c, and that rotation of the differential carrier 83c can similarly cause corresponding rotation of the first intermediate output gear 2040. The second intermediate output gear 2042 can be meshingly engaged to the input member 86c. The input member 86c can be integrally formed on the first ring gear 54c. Accordingly, rotation of the second intermediate output gear 2042 can cause corresponding rotation of the input member 86c and the first ring gear 54c. It will be appreciated that the ring gear 2056 can be drivingly coupled to an optional primary drive similar to the engine 120 (FIG. 1), and inclusion of a primary drive with the axle assembly 10c will serve to operate in a manner similar to when the primary drive is included with the axle assembly 10 (FIG. 1).

The clutch mechanism 2000 can be employed to control operation of the drive mechanism 14c in a neutral condition (shown), a propulsion mode (i.e. drive or equal torque mode) or a torque-vectoring mode. The clutch mechanism 2000 can include a clutch collar 2060 having a set of internal teeth that can be meshingly engaged to a set of external teeth formed on the drive member 2038. Accordingly, rotation of the intermediate shaft 2016 will cause corresponding rotation of the clutch collar 2060. A first set of clutch teeth 2070 can be formed on the first intermediate output gear 2040 and a second set of clutch teeth 2072 can be formed on the second intermediate output gear 2042. The clutch collar 2060 can be shifted axially along the intermediate axis 2020 such that the set of internal teeth formed on the clutch collar 2060 are engaged with the first set of clutch teeth 2070 (to thereby couple the first intermediate output gear 2040 to the intermediate shaft 2016 for common rotation), or such that the set of internal teeth formed on the clutch collar 2060 are engaged with the second set of clutch teeth 2072 (to thereby couple the second intermediate output gear 2042 to the intermediate shaft 2016 for common rotation), or such that the set of internal teeth formed on the clutch collar 2060 are not engaged to either the first set of clutch teeth 2070 or the second set of clutch teeth 2072 (so that neither of the first and second intermediate output gears 2040 and 2042 is coupled to the intermediate shaft 2016 for rotation therewith).

In the particular example provided, a clutch fork 2090 is employed to control the axial position of the clutch collar 2060. While not specifically shown, the clutch fork 2090 can be moved by any type of actuator to axially move the clutch fork 2090 to axially move the clutch collar 2060 along the intermediate axis 2020. The actuator (not shown) can be similar to actuator 150 of FIGS. 1 and 2. The actuator (not shown) can be controlled by a control module (not shown) that can be similar to the control module 210 of FIGS. 1 and 2. The control module (not shown) can receive input signals from sensors (not shown) that can be similar to sensors 214, 216, 218, 220, 222 of FIGS. 1 and 2.

Operation of the clutch mechanism 2000 in a first mode (i.e., propulsion mode) can couple the first intermediate output gear 2040 to the intermediate shaft 2016 (via the clutch collar 2060) to thereby drive the ring gear 2056 of the differential assembly 36c. As will be appreciated, rotation of the ring gear 2056 drives the differential carrier 83c and the cross-pin 110 for rotation about the output axis 2024. Pinion gears 112 are rotatably disposed on the cross-pin 110 and meshingly engaged with first and second side gears 100 and 102. The first side gear 100 is drivingly engaged to the first output member 16c and the second side gear 102 is drivingly engaged to the second output member 18c. In this mode, the dual planetary gear set 30 does not affect operation of the differential assembly 36c and as such, the differential assembly 36c provides rotary power to the first and second output members 16c and 18c in the manner of a standard open differential assembly.

Operation of the clutch mechanism 2000 in a second mode (i.e., torque vectoring mode) can couple the second intermediate output gear 2042 to the intermediate shaft 2016 (via the clutch collar 2060) to thereby drive the input member 86c and the first ring gear 54c of the dual planetary gear set 30. In this embodiment, rotary power is output from the first planetary gear set 40c to the differential carrier 83c (via the first planet carrier 56c) and rotary power is output from the second planetary gear set 42c to the second output member 18c (via the second planet carrier 76c). As the second output member 18c is non-rotatably coupled the second side gear 102, it will be appreciated that the second planet carrier 76c is also drivingly coupled to the second side gear 102. Those of skill in the art will appreciate from this disclosure that the dual planetary gear set 30 can be employed to impose an equal but opposite torque difference on the first and second output members 16c and 18c and that the amount of torque applied to a given one of the output members is dependent upon the direction in which the motor 2004 is operated.

With additional reference to FIG. 5, a flow chart of a logic routine 510 is illustrated for switching between modes of a torque distribution drive mechanism such as the torque distribution drive mechanisms 14a, 14b, or 14c (FIGS. 1-4) described above. The logic routine 510 can be used by the control module 210 (FIGS. 1 and 2) and can be programmed into the control module 210 or the computer-readable medium (not shown) accessible by the control module 210. In this way, the control module 210 can follow the steps of the logic routine 510 when controlling the actuator 150 (FIGS. 1 and 2).

At step 514 of the logic routine 510, the control module 210 can check or receive input information from the sensors 214, 216, 218, 220, 222 (FIGS. 1 and 2) and the actuator 150. This input information can be in the form of electrical signals for example sent by the sensors 214, 216, 218, 220, 222 and the actuator 150 to the control module 210. The input information can also include values stored in the control module 210, or in the computer-readable medium, or can be calculated based on the measured values, such as in a look-up table for example. The input information can include the actual torque output (T), driver torque requested (τ), system energy available (E), longitudinal velocity (v), vehicle lateral instability (s), high velocity threshold (v_1), low velocity threshold (v_2), traction torque threshold (T_1), system energy threshold (E_1), low demand threshold (τ_1), high demand threshold (τ_2), lateral instability threshold (s_1), and current mode of the drive mechanism 14a, 14b, or 14c (e.g. high speed propulsion, low speed propulsion, torque vectoring, or neutral). After receiving the input values, the logic routine 510 can proceed to step 518. It is understood that the control module 210 can also look up, calculate, or receive the specific input values as needed instead of receiving all input values during step 514.

At step 518, the control module 210 can determine what mode the drive mechanism 14a, 14b, 14c is in (e.g. the propulsion mode, the torque vectoring mode, or the neutral mode). If the drive mechanism 14a, 14b, 14c is in the propulsion mode, then the logic routine 510 can proceed to step 522. If the drive mechanism 14a, 14b, 14c is not in the propulsion mode, then the logic routine 510 can proceed to step 526.

At step 522, the control module 210 can check if a first set of conditions 528 are met. The first set of conditions 528 can include: if the driver torque requested (τ) is less than or equal to the low demand threshold (τ_1); and if the longitudinal velocity (v) is greater than or equal to the high velocity threshold (v_1). The first set of conditions 528 can also include: if the actual torque output (T) is less than or equal to the traction torque threshold (T_1). If any of the conditions of the first set of conditions 528 is not met, then the logic routine 510 can return to step 514. If all of the conditions of the first set of conditions 528 are met, then the logic routine 510 can proceed to step 530. In the example provided, when the longitudinal velocity (v) is zero (e.g. the vehicle 12 is stopped) or negative (e.g. the vehicle 12 is moving in reverse), the longitudinal velocity (v) can be considered less than or equal to the high velocity threshold (v_1). In an alternative configuration, the absolute value of the longitudinal velocity (v) can be used, such that if the vehicle 12 is traveling forward or reverse at a speed greater than or equal to the high velocity threshold (v_1), then the vehicle's 12 longitudinal velocity (v) is considered greater than or equal to the high velocity threshold (v_1).

At step 530, the control module 210 can send a control signal to the actuator 150 to switch the drive mechanism 14a, 14b, 14c to the torque vectoring mode. After switching the drive mechanism 14a, 14b, 14c to the torque vectoring mode, the logic routine 510 can return to step 514.

Returning to step 518, if the drive mechanism 14a, 14b, 14c is not in the propulsion mode, then the logic routine 510 can proceed to step 526. At step 526, the control module 210 can check if a second set of conditions 532 are met. The second set of conditions 532 can include: if the longitudinal velocity (v) is less than or equal to the low velocity threshold (v_2); and if the absolute value of the lateral instability (s) is less than or equal to the lateral instability threshold (s_1). Since the absolute value of the lateral instability (s) is used, when the amount of oversteer or the amount of understeer is less than or equal to a predetermined amount indicated by the lateral instability threshold (s_1), the vehicle is considered stable. Alternatively, the instability element of the second set of conditions 532 can include a range of values, such that the lateral instability (s) is greater than or equal to the oversteer threshold (s_2) and less than or equal to the understeer threshold (s_3). In such an example, the amount of oversteer and the amount of understeer indicative of instability can be different values. The second set of conditions 532 can also include: if the system energy available (E) is greater than or equal to the system energy threshold (E_1). If all of the conditions of the second set of conditions 532 are met, then the logic routine 510 can proceed to step 534. If any of the conditions of the second set of conditions 532 is not met, then the logic routine 510 can proceed to step 538.

At step 534, the control module 210 can send a control signal to the actuator 150 to switch the drive mechanism 14a, 14b, 14c to the propulsion mode. After switching the drive mechanism 14a, 14b, 14c to the propulsion mode, the logic routine 510 can return to step 514.

Returning to step 526, if any of the conditions of the second set of conditions 532 is not met, then the logic routine 510 can proceed to step 538. At step 538, the control module 210 can check if a third set of conditions 540 are met. The third set of conditions 540 can include: if the driver torque requested (τ) is greater than or equal to the high demand threshold (τ_2). If all of the conditions of the third set of conditions 540 are met, then the logic routine 510 can proceed to step 534. If any of the conditions of the third set of conditions 540 is not met, then the logic routine 510 can proceed to step 542.

At step 542, the control module 210 can check if the drive mechanism 14a,14b, 14c is in the torque vectoring mode. If the drive mechanism 14a,14b, 14c is in the torque vectoring mode, then the logic routine 510 can return to step 514. If the drive mechanism 14a,14b, 14c is not in the torque vectoring mode (e.g. is in the neutral mode), then the logic routine 510 can proceed to step 522.

In operation, when the drive mechanism 14a, 14b, 14c is not already in propulsion mode, the control module 210 can be configured to only switch the drive mechanism 14a, 14b, 14c to the propulsion mode when either the second or the third set of conditions 532, 540 is met. For example, when the torque demand is high (τ≥τ_2), or when the vehicle 12 is operating at low speeds (v≤v_2), the vehicle is stable (|s|≤s_1), and the energy available is adequate (E≥E_1). This allows the drive mechanism 14a, 14b, 14c to be pre-positioned and prepared to provide propulsive torque to the wheels 20, 22 to accelerate the vehicle 12 when torque vectoring is generally less desired and the energy storage device has adequate energy available to operate the drive mechanism 14a, 14b, 14c in propulsion mode. This also allows the drive mechanism 14a, 14b, 14c to be operated in the propulsion mode when the driver demands a predetermined high level of torque regardless of speed, energy, or instability.

If the drive mechanism 14a, 14b, 14c is not already in torque vectoring mode, the control module 210 can be configured to switch the drive mechanism 14a, 14b, 14c to the torque vectoring mode when the first set of conditions 528 are met. For example, when the torque demand is low (T≤T_1), the vehicle 12 is operating at high speeds (v≥v_1), and torque output of the drive mechanism 14a, 14b, 14c is below a threshold level (T≤T_1). This allows the drive mechanism 14a, 14b, 14c to be pre-positioned and prepared to provide torque vectoring to improve handling and lateral performance. In this way, the torque vectoring mode can be the default mode for high speeds and the drive mechanism 14a, 14b, 14c can be configured to remain in torque vectoring mode until either the second or third sets of conditions 532, 540 are met.

With additional reference to FIG. 6, a flow chart of a second logic routine 610 is illustrated for switching between modes of a torque distribution drive mechanism that includes a low speed propulsion mode, such as the drive mechanism 14b. The second logic routine 610 can be similar to logic routine 510 (FIG. 5) except as illustrated and described herein.

At step 614, the control module 210 (FIGS. 1 and 2) can check or receive input information from the sensors 214, 216, 218, 220, 222 (FIGS. 1 and 2) and the actuator 150 (FIGS. 1 and 2) similar to step 514 (FIG. 5). After receiving the input values, the logic routine 610 can proceed to step 618.

At step 618, the control module 210 can determine what mode the drive mechanism 14b is in (e.g. the high speed propulsion mode, the low speed propulsion mode, the torque vectoring mode, or the neutral mode). If the drive mechanism 14b is in the high speed propulsion mode, then the logic routine 610 can proceed to step 622. If the drive mechanism 14b is not in the high speed propulsion mode, then the logic routine 610 can proceed to step 624.

At step 622, the control module 210 can check if a first set of conditions 628 are met similar to step 522 (FIG. 5). The first set of conditions 628 can be similar to the first set of conditions 528 (FIG. 5). If any of the conditions of the first set of conditions 628 is not met, then the logic routine 610 can return to step 614. If all of the conditions of the first set of conditions 628 are met, then the logic routine 610 can proceed to step 630.

At step 630, the control module 210 can send a control signal to the actuator 150 to switch the drive mechanism 14b to the torque vectoring mode. After switching the drive mechanism 14b to the torque vectoring mode, the logic routine 610 can return to step 614.

Returning to step 618, if the drive mechanism 14b is not in the high speed propulsion mode, then the logic routine 610 can proceed to step 624. At step 624, the control module 210 can check if the drive mechanism 14b is in the low speed propulsion mode. If the drive mechanism 14b is not in the low speed propulsion mode, then the logic routine 610 can proceed to step 626. If the drive mechanism 14b is in the low speed propulsion mode, then the logic routine 610 can proceed to step 638.

At step 626, The control module 210 can check if a second set of conditions 632 are met, similar to step 526 (FIG. 5). The second set of conditions 632 can be similar to the second set of conditions 532 (FIG. 5). If all of the conditions of the second set of conditions 632 are met, then the logic routine 610 can proceed to step 634. If any of the conditions of the second set of conditions 632 is not met, then the logic routine 610 can proceed to step 638.

At step 634, the control module 210 can send a control signal to the actuator 150 to switch the drive mechanism 14b to the low speed propulsion mode. After switching the drive mechanism 14b to the low speed propulsion mode, the logic routine 610 can return to step 614.

Returning to step 626, if any of the conditions of the second set of conditions 632 is not met, then the logic routine 610 can proceed to step 638. At step 638, the control module 210 can check if a third set of conditions 640 are met, similar to step 538 (FIG. 5). The third set of conditions 640 can be similar to the third set of conditions 540 (FIG. 5). If any of the conditions of the third set of conditions 640 is not met, then the logic routine 610 can proceed to step 642. If all of the conditions of the third set of conditions 640 are met, then the logic routine 610 can proceed to step 644.

At step 642, the control module 210 can check if the drive mechanism 14b is in the torque vectoring mode, similar to step 542 (FIG. 5). If the drive mechanism 14b is in the torque vectoring mode, then the logic routine 610 can return to step 614. If the drive mechanism 14b is not in the torque vectoring mode (e.g. is in the low speed propulsion mode or the neutral mode), then the logic routine 610 can proceed to step 622.

Returning to step 638, if all of the conditions of the third set of conditions 640 are met, then the logic routine 610 can proceed to step 644. At step 644, the control module 210 can send a control signal to the actuator 150 to switch the drive mechanism 14b to the high speed propulsion mode. After switching the drive mechanism 14b to the high speed propulsion mode, the logic routine 610 can return to step 614.

In operation, when the drive mechanism 14b is not already in the high speed propulsion mode, the control module 210 can be configured to only switch the drive mechanism 14b to the high speed propulsion mode when the third set of conditions 640 is met. For example, when the torque demand is high (T≥T_2), This also allows the drive mechanism 14b to be operated in the high speed propulsion mode when the driver demands a predetermined high level of torque regardless of vehicle speed, energy, or instability.

When the drive mechanism 14b is not already in the low speed propulsion mode, the control module 210 can be configured to only switch the drive mechanism 14b to the low speed propulsion mode when the second set of conditions 632 is met. For example, when the vehicle 12 is operating at low speeds (v≤v_2), the vehicle is stable (|s|≤s_1), and the energy available is adequate (E≥E_1). This allows the drive mechanism 14b to be pre-positioned and prepared to provide propulsive torque to the wheels 20, 22 to accelerate the vehicle 12 when torque vectoring is generally less desired (e.g. the vehicle is laterally stable), speeds are low, and the energy storage device has adequate energy available to operate the drive mechanism 14b in the low speed propulsion mode.

If the drive mechanism 14b is not already in the torque vectoring mode, the control module 210 can be configured to switch the drive mechanism 14b to the torque vectoring mode when the first set of conditions 628 are met. For example, when the torque demand is low (T≤T_1), the vehicle 12 is operating at high speeds (v≥v_1), and torque output of the drive mechanism 14b is below a threshold level (T≤T_1). This allows the drive mechanism 14b to be pre-positioned and prepared to provide torque vectoring to improve handling and lateral performance. In this way, the torque vectoring mode can be the default mode for high speeds and the drive mechanism 14b can be configured to remain in torque vectoring mode until either the second or third sets of conditions 632, 640 are met.

In this application, including the definitions below, the term "module" or the term "controller" may be replaced with the term "circuit." The term "module" may refer to, be part of, or include: an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor circuit (shared, dedicated, or group) that executes code; a memory circuit (shared, dedicated, or group) that stores code executed by the processor circuit; other suitable hardware components that provide the described functionality; or a combination of some or all of the above, such as in a system-on-chip.

The module may include one or more interface circuits. In some examples, the interface circuits may include wired or wireless interfaces that are connected to a local area network (LAN), the Internet, a wide area network (WAN), or combinations thereof. The functionality of any given module of the present disclosure may be distributed among multiple modules that are connected via interface circuits. For example, multiple modules may allow load balancing. In a further example, a server (also known as remote, or cloud) module may accomplish some functionality on behalf of a client module.

The term code, as used above, may include software, firmware, and/or microcode, and may refer to programs, routines, functions, classes, data structures, and/or objects. The term shared processor circuit encompasses a single processor circuit that executes some or all code from multiple modules. The term group processor circuit encompasses a processor circuit that, in combination with additional processor circuits, executes some or all code from one or more modules. References to multiple processor circuits encompass multiple processor circuits on discrete dies, multiple processor circuits on a single die, multiple cores of a single processor circuit, multiple threads of a single processor circuit, or a combination of the above. The term shared memory circuit encompasses a single memory circuit that stores some or all code from multiple modules. The term group memory circuit encompasses a memory circuit that, in combination with additional memories, stores some or all code from one or more modules.

The term memory circuit is a subset of the term computer-readable medium. The term computer-readable medium, as used herein, does not encompass transitory electrical or electromagnetic signals propagating through a medium (such as on a carrier wave); the term computer-readable medium may therefore be considered tangible and non-transitory. Non-limiting examples of a non-transitory, tangible computer-readable medium are nonvolatile memory circuits (such as a flash memory circuit, an erasable programmable read-only memory circuit, or a mask read-only memory circuit), volatile memory circuits (such as a static random access memory circuit or a dynamic random access memory circuit), magnetic storage media (such as an analog or digital magnetic tape or a hard disk drive), and optical storage media (such as a CD, a DVD, or a Blu-ray Disc).

The apparatuses and methods described in this application may be partially or fully implemented by a special purpose computer created by configuring a general purpose computer to execute one or more particular functions embodied in computer programs. The functional blocks, flowchart components, and other elements described above serve as software specifications, which can be translated into the computer programs by the routine work of a skilled technician or programmer.

The computer programs include processor-executable instructions that are stored on at least one non-transitory, tangible computer-readable medium. The computer programs may also include or rely on stored data. The computer programs may encompass a basic input/output system (BIOS) that interacts with hardware of the special purpose computer, device drivers that interact with particular devices of the special purpose computer, one or more operating systems, user applications, background services, background applications, etc.

The computer programs may include: (i) descriptive text to be parsed, such as HTML (hypertext markup language) or XML (extensible markup language), (ii) assembly code, (iii) object code generated from source code by a compiler, (iv) source code for execution by an interpreter, (v) source code for compilation and execution by a just-in-time compiler, etc. As examples only, source code may be written using syntax from languages including C, C++, C#, Objective C, Haskell, Go, SQL, R, Lisp, Java®, Fortran, Perl, Pascal, Curl, OCaml, Javascript®, HTML5, Ada, ASP (active server pages), PHP, Scala, Eiffel, Smalltalk, Erlang, Ruby, Flash®, Visual Basic®, Lua, and Python®.

It will be appreciated that the above description is merely exemplary in nature and is not intended to limit the present disclosure, its application or uses. While specific examples have been described in the specification and illustrated in the drawings, it will be understood by those of ordinary skill in the art that various changes may be made and equivalents may be substituted for elements thereof without departing from the scope of the present disclosure as defined in the claims. Furthermore, the mixing and matching of features, elements and/or functions between various examples is expressly contemplated herein, even if not specifically shown or described, so that one of ordinary skill in the art would appreciate from this disclosure that features, elements and/or functions of one example may be incorporated into another example as appropriate, unless described otherwise, above. Moreover, many modifications may be made to adapt a particular situation or material to the teachings of the present disclosure without departing from the essential scope thereof. Therefore, it is intended that the present disclosure not be limited to the particular examples illustrated by the drawings and described in the specification as the best mode presently contemplated for carrying out the teachings of the present disclosure, but that the scope of the present disclosure will include any embodiments falling within the foregoing description and the appended claims.

What is claimed is:

1. A method for controlling transmission of power to a set of vehicle wheels, the method comprising:
providing a drive module for powering the set of vehicle wheels, the drive module being operable in a torque vectoring mode and at least one propulsion mode;
switching the drive module to the torque vectoring mode when a first set of conditions is met; and
switching the drive module to a propulsion mode of the at least one propulsion mode when either a second set of conditions is met or a third set of conditions is met; and wherein the first set of conditions includes:
a torque requested by an operator of the vehicle is less than or equal to a first predetermined demand threshold; and
a velocity of the vehicle is greater than or equal to a first predetermined velocity threshold;
wherein the second set of conditions includes:
the velocity of the vehicle is less than a second predetermined velocity threshold; and
a lateral instability of the vehicle is less than or equal to a predetermined instability threshold; and
wherein the third set of conditions includes:
the torque requested by the operator of the vehicle is greater than a second predetermined demand threshold.

2. The method of claim 1, wherein the first set of conditions further includes: a torque output of the drive module is less than or equal to a predetermined torque threshold.

3. The method of claim 1, wherein the second set of conditions further includes: an energy level of a power storage device is greater than or equal to a predetermined energy level.

4. The method of claim 1, wherein the second predetermined demand threshold is greater than or equal to the first predetermined demand threshold.

5. The method of claim 1, wherein the second predetermined velocity threshold is less than or equal to the first predetermined velocity threshold.

6. The method of claim 1, wherein the at least one propulsion mode includes a first propulsion mode and a second propulsion mode, and wherein the method includes switching the drive module to the first propulsion mode when the second set of conditions is met and switching the drive module to the second propulsion mode when the third set of conditions is met.

7. The method of claim 6, wherein the first propulsion mode is a low speed propulsion mode and the second propulsion mode is a high speed propulsion mode.

8. A controller for a drive module that is operable in a plurality of modes to drive a pair of vehicle wheels, the controller being configured to:
determine a torque requested by an operator of the vehicle, a velocity of the vehicle, and a level of instability of the vehicle;
switch the drive module to a torque vectoring mode when a first set of conditions is met; and
switch the drive module to a propulsion mode when either a second set of conditions is met or a third set of conditions is met;
wherein the first set of conditions includes:
the torque requested by the operator is less than or equal to a first predetermined demand threshold; and
the velocity of the vehicle is greater than or equal to a first predetermined velocity threshold;
wherein the second set of conditions includes:
the velocity of the vehicle is less than a second predetermined velocity threshold; and
a lateral instability of the vehicle is less than or equal to a predetermined instability threshold; and
wherein the third set of conditions includes:
the torque requested by the operator of the vehicle is greater than a second predetermined demand threshold.

9. The controller of claim 8, wherein the first set of conditions further includes: a torque output of the drive module is less than or equal to a predetermined torque threshold.

10. The controller of claim 8, wherein the second set of conditions further includes: an energy level of a power storage device is greater than or equal to a predetermined energy level.

11. The controller of claim 8, wherein the second predetermined demand threshold is greater than or equal to the first predetermined demand threshold.

12. The controller of claim 8, wherein the second predetermined velocity threshold is less than or equal to the first predetermined velocity threshold.

13. The controller of claim 8, wherein the controller is configured to switch the drive module to a low speed propulsion mode when the second set of conditions is met, and to switch the drive module to a high speed propulsion mode when the third set of conditions is met.

14. A drive module comprising:
a motor;
an input member driven by the motor;
a differential assembly having a differential carrier and first and second differential outputs received in the differential carrier;
a transmission receiving rotary power from the input member;
a shiftable element that is axially movable between a first position and a second position, wherein positioning of the shiftable element in the first position couples the transmission to the differential assembly to establish a torque vectoring mode in which the transmission applies an equal but oppositely directed torque to the first and second differential outputs, and wherein positioning of the shiftable element in the second position couples the transmission to the differential assembly to directly drive the differential carrier;
an actuator coupled to the shiftable element and configured to axially move the shiftable element between the first and second positions; and
a control module configured to control the actuator to move the shiftable element to the first position when a first set of conditions is met, and to move the shiftable element to the second position when one of a second set of conditions is met or a third set of conditions is met;
wherein the first set of conditions includes:
a torque requested by the operator is less than or equal to a first predetermined demand threshold; and
a velocity of the vehicle is greater than or equal to a first predetermined velocity threshold;
wherein the second set of conditions includes:
the velocity of the vehicle is less than a second predetermined velocity threshold; and
a lateral instability of the vehicle is less than or equal to a predetermined instability threshold; and
wherein the third set of conditions includes:
the torque requested by the operator of the vehicle is greater than a second predetermined demand threshold.

15. The drive module of claim 14, wherein the first set of conditions further includes: a torque output of the drive module is less than or equal to a predetermined torque threshold.

16. The drive module of claim 14, wherein the second set of conditions further includes: an energy level of a power storage device is greater than or equal to a predetermined energy level.

17. The drive module of claim 14, wherein the second predetermined demand threshold is greater than or equal to the first predetermined demand threshold.

18. The drive module of claim 14, wherein the second predetermined velocity threshold is less than or equal to the first predetermined velocity threshold.

19. The drive module of claim 14, wherein the transmission includes a first planetary stage and a second planetary stage, the first planetary stage having a first sun gear that is coupled to a second sun gear of the second planetary stage for rotation therewith.

20. The drive module of claim 19, wherein the shiftable element is axially movable to a third position, wherein positioning of the shiftable element in the third position couples the transmission to the first and second sun gears to directly drive the first and second sun gears, wherein the control module is configured to control the actuator to move the shiftable element to the third position when the second set of conditions is met, and to move the shiftable element to the second position when the third set of conditions is met.

* * * * *